United States Patent [19]

Riese et al.

[11] Patent Number: 4,458,793
[45] Date of Patent: Jul. 10, 1984

[54] HYDRAULIC CLUTCH BRAKE FOR WET PLATE CLUTCHES

[75] Inventors: Hans-Walter Riese, Schwebheim; Achim Link, Schweinfurt, both of Fed. Rep. of Germany

[73] Assignee: Fichtel & Sachs AG, Schweinfurt, Fed. Rep. of Germany

[21] Appl. No.: 324,523

[22] Filed: Nov. 24, 1981

[30] Foreign Application Priority Data

Dec. 18, 1980 [DE] Fed. Rep. of Germany ....... 3047778

[51] Int. Cl.$^3$ ............... B60K 41/24; F16D 13/74
[52] U.S. Cl. .................. 192/12 A; 192/113 B; 192/70.12
[58] Field of Search ............ 192/113 B, 98, 110 B, 192/70.12, 89 B, 12 A, 264 R, 264 B, 264 D, 264 E

[56] References Cited

U.S. PATENT DOCUMENTS

| | | | |
|---|---|---|---|
| 3,773,157 | 11/1973 | Koch, Jr. et al. | 192/113 B |
| 4,142,619 | 3/1979 | Spokas | 192/113 B |
| 4,321,990 | 3/1982 | Koch, Jr. | 192/12 A |

Primary Examiner—George H. Krizmanich
Assistant Examiner—M. Manley
Attorney, Agent, or Firm—Toren, McGeady and Stanger

[57] ABSTRACT

A vehicle clutch having clutch plate and disc members within a sealed clutch housing operative to effect engagement and disengagement of the clutch by operation of a disengaging member. An oil pump structurally associated with the disengaging member provides oil for the clutch through a guide wheel which is axially movable together with the disengaging member. In the engaged position, a deflector directs an oil stream from the guide wheel through openings to the clutch plate and disc members, while in the disengaged position a pump wheel is provided with pump impeller blades to deflect the oil stream from the guide wheel away from the clutch plate and disc members.

3 Claims, 2 Drawing Figures

HYDRAULIC CLUTCH BRAKE FOR WET PLATE CLUTCHES

The present invention relates generally to clutches for vehicles and more particularly to clutches wherein clutch plate means rotating within a sealed clutch housing are operatively engaged with clutch discs which may be actuated by means of a spring member controlled by a disengaging member of the clutch. The clutch also comprises an oil pump which is associated with the disengaging member by means of which an oil stream may be applied against the clutch discs through a deflector which is structurally associated with the clutch plate means.

In wet plate clutches or wet operating clutches, as compared with dry plate clutches, a plurality of discs must be provided because of the low friction value developed. In such wet plate clutches, an oil stream is usually fed to the clutch discs for cooling. Due to the fact that a plurality of clutch discs are involved, the rotating mass which must be braked during each shifting step by synchronization of a transmission is enlarged.

The oil stream which is fed to the clutch discs simultaneously generates a drag moment which can operate to negatively affect the shifting process. In order to maintain this drag moment as small as possible, the oil stream should be diverted or deflected when the clutch is in the disengaged condition.

The large inertia moment of the clutch discs together with the additional drag moment developed by the oil stream can have a negative effect upon the ease with which shifting may be effected due to the longer shifting periods involved or because of shifting difficulties.

In German Auslegeschfrit No. 23 45 774, there is disclosed a clutch brake with an axially movable braking member for braking the rotating mass of the clutch in order to improve the ease with which shifting may be accomplished. However, it has been found that clutches of this type of the prior art result in increased expenditures.

Accordingly, the present invention is directed toward provision of a clutch braking mechanism for wet plate clutches involving only limited additional expenditures whereby the rotating mass of the clutch discs can be effectively braked and a drag moment due to the oil stream in said clutches can be eliminated to a substantial extent.

SUMMARY OF THE INVENTION

Briefly, the present invention may be described as a clutch for vehicles which comprises a clutch housing having a guide wheel arranged therein which is connected with a disengaging member of the clutch and which is axially movable together with the disengaging member. Furthermore, the invention includes a pump wheel which is related with an oil deflector of the clutch plate. In the disengaged state, the oil stream for the clutch may be deflected by means of the pump wheel at an angle leading away from the clutch plate and the clutch discs. With these measures, a clutch brake is created which is controlled by the disengaging member in dependence upon its path of movement. When the clutch is disengaged, the oil stream is deflected and accelerated by the elements constituting the clutch brake from the direction of rotation of the clutch plate and the clutch discs. The work which is performed thus acts as a braking torque on the clutch discs. At the same time, the oil stream to the clutch discs is interrupted and thus the drag moment is prevented.

Additional expenditures to achieve this braking torque are relatively small and consist essentially only in coupling the guide wheel with the sliding sleeve of the disengaging member and of the additional pump wheel which is advantageously welded by spot welding to the deflector which is connected with the clutch plates.

In accordance with another aspect of the invention, there is provided an arrangement wherein the pump wheel guides the oil stream in the disengaged condition out of the clutch and wherein the guide wheel is arranged concentrically in the clutch and conveys the oil stream radially outwardly with the oil stream being deflected also in an axial direction with the clutch in the disengaged state. The pump wheel is provided at its radial outer periphery with an axial curvature with which the oil stream may be deflected in the axial direction when the clutch is in the disengaged state, with this axial curvature lying in the region of the clutch discs.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
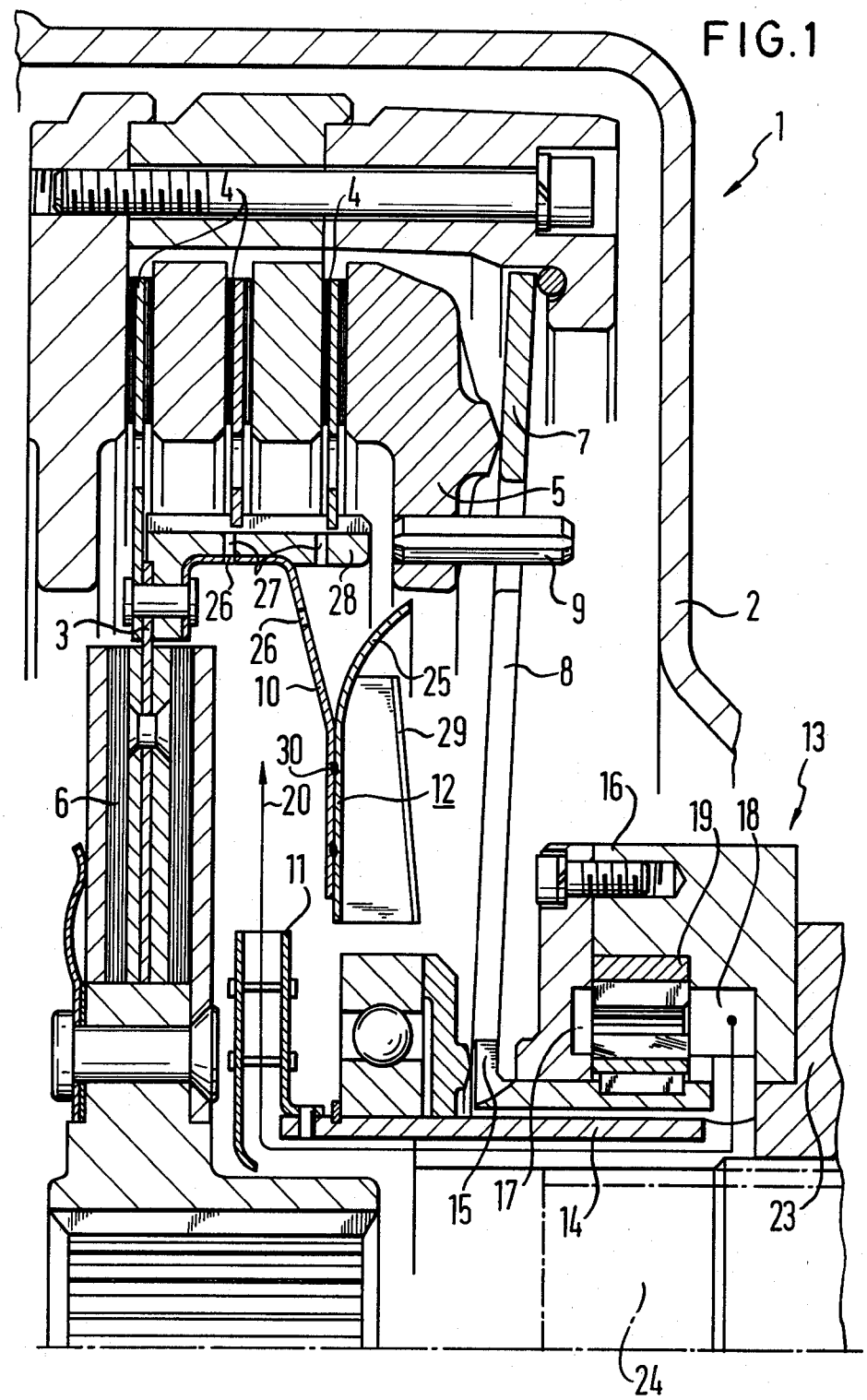
FIG. 1 is a sectional view showing a wet plate clutch having the clutch braking system in accordance with the invention, with the clutch shown in the engaged state.

Referring now to the drawings, there is shown a clutch 1 having a plurality of clutch discs 4 which are connected on the radially outer side of a clutch plate 3. In the embodiment depicted, three clutch discs 4 are provided with the arrangement including a clutch housing 2.

The clutch discs 4 are held in engagement by a diaphragm spring 7 by means of a pressure plate 5. The diaphragm spring 7 is radially centered by a centering bolt 9 with respect to the pressure plate 5 and extends on its radially inner side with diaphragm spring tongues 8.

A disengaging member 13 is provided with an axially slidable release rim 15 which acts on the radially inwardly located ends of the diaphragm spring tongues 8. In order to compensate for possible motor vibrations, a vibration damper 6 is assigned to the clutch plate 3. A deflector 10 is located radially between the vibration damper 6 and the clutch discs 4, with the deflector 10 being arranged at the clutch plate 3 and being preferably riveted together with the clutch discs 4 in order thus to rotate together with the clutch plate 3.

Openings 26 through which oil may pass are provided in the deflector 10. Furthermore, guide discs 28 are provided having therein guide openings 27 through which oil may also pass. As a result, the oil may reach the clutch discs 4 through the openings 26 and the guide openings 27.

The deflector 10 extends in an axially displaced arrangement approximately parallel to the clutch plate 3. On the side thereof which faces away in the axial direction from the clutch plate 3, there is provided a pump wheel 12 which is rigidly connected for rotation with the deflector 10, preferably by means of welding joints 30. The pump wheel 12 has at its radially outer periphery an axial curvature which faces away from the deflector 10 and thus away from the clutch plate 3. Pump impeller blades 29 extending perpendicularly to the pump wheel 12 are arranged in order to guide oil radially outwardly into the region of the axial curvature 25. The axial curvature 25 adjoins the clutch discs 4 and the disc guidances 28 radially inwardly thereof.

In the disengaging member 13 which acts on the radially inwardly located diaphragm spring tongues 8 there is arranged a rotatable sleeve 14 which projects into the clutch 1 up to proximity with the clutch plate 3. At the end adjoining the clutch plate 3, a guide wheel 11 is rigidly connected for rotation with the rotatable sleeve 14, preferably by a riveted connection.

An oil pump 16, which may be a so-called half-moon pump, is structually associated with the disengaging member 13. The oil pump 16 is attached, for example, at a guide part 23 of the disengaging member 13 and it is also driven by the motor of the apparatus. The pump has a suction side 17 which faces the clutch 1 and a pressure side 18 which faces a transmission housing (not shown) with a feed wheel 19 operating to feed oil from the suction side 17 to the pressure side 18.

An oil stream is thus developed by the oil pump 16 which flows through the rotatable sleeve 14 to the guide wheel 11 into the clutch housing 2. The rotatable sleeve 14 is continuously rotated on the transmission shaft 24. The guide wheel 11 also rotates so long as the rotatable sleeve 14 and the oil pump 16 rotate. This results in an uninterrupted radially outwardly directed oil stream 20 which, when viewed from above, will have an approximately planar appearance in the axial direction. The oil stream 20 penetrates the openings 26 and the guide openings 27 at the clutch discs 4 and operates to cool and lubricate the clutch discs.

Figure 2:
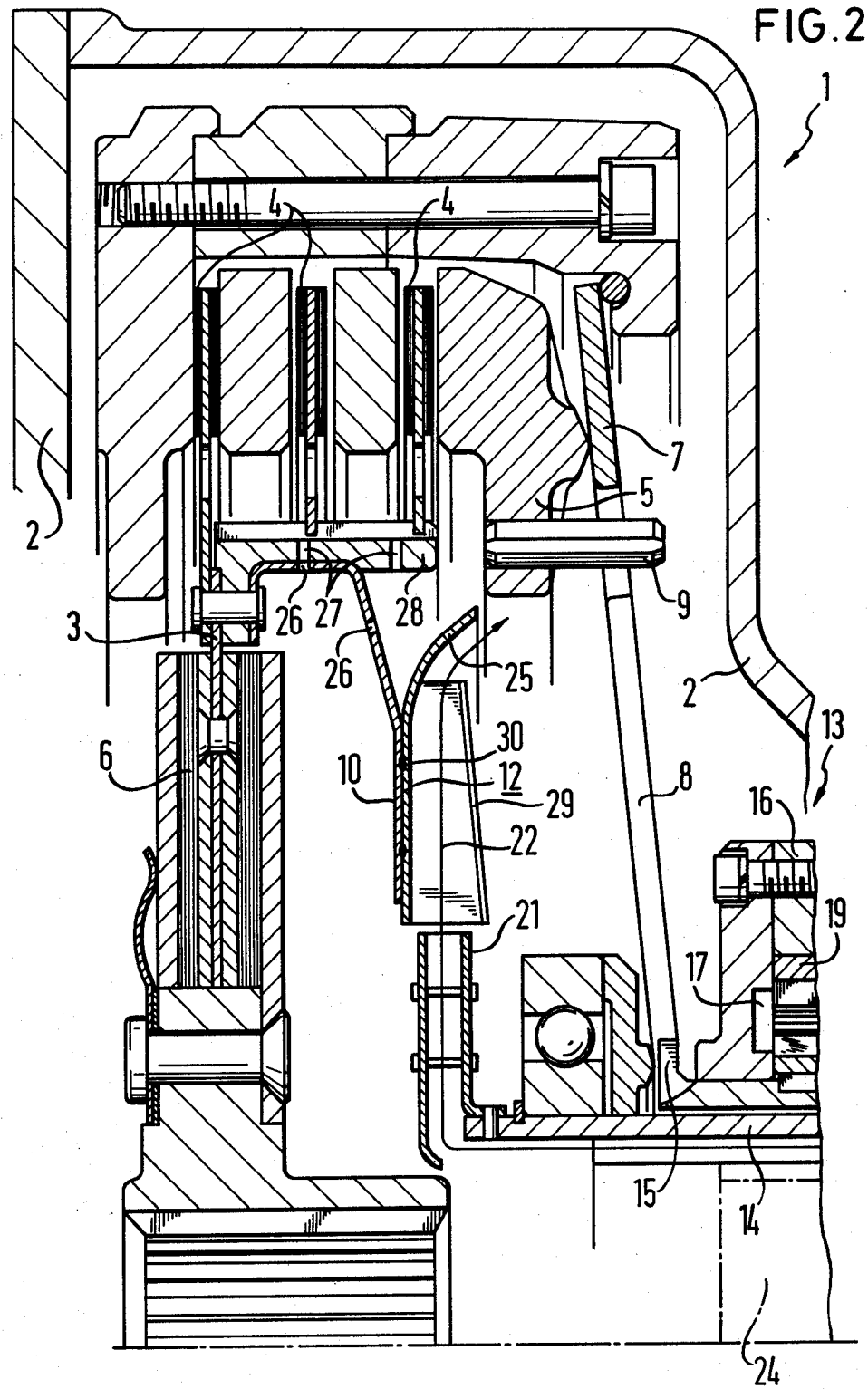
FIG. 2 is a sectional view showing the clutch of FIG. 1 in the disengaged state.

When the clutch 1 is in the disengaged condition shown in FIG. 2, the rotatable sleeve 14 in moved by the disengaging member 13 away from the clutch plate 3 axially to the right as seen in FIG. 2. The guide wheel 11 is thus moved to its clutch-disengaged position 21 and it operates to feed the oil stream 20 along a path 22 against the pump wheel 12 during the disengaged state of the clutch. Accordingly, oil will no longer reach the clutch discs 4 and as a result drag moment is prevented. At the same time, the oil is deflected in the axial direction along the path 22 as a result of impingement along the axial curvature 25 and it is accelerated. Due to the work which is performed during this occurrence, a brake torque is developed on the clutch plate 3 and this torque acts to provide a braking action and thus essentially constitutes a clutch brake.

The oil is conducted axially away from the clutch housing 2 due to the axial curvature 25 and back to the suction side 17 of the oil pump 16. Here the oil becomes available for repeated redistribution to the guide wheel 11. The oil stream 20 consequently flows in an uninterrupted manner while the clutch is engaged as well as during the time that the clutch is disengaged.

If the clutch 1 is to be again engaged, for example after completion of a shifting operation, then the disengaging member 14 is balanced and the diaphragm spring 7 presses the pressure plate 5 against the clutch disc 4 once again. The rotatable sleeve 14 with the guide wheel 11 which is placed at its end will move again toward the clutch plate 3 and the oil stream 20 will be again conducted against the deflector 10, as previously described. Of course, disengagement and braking action can subsequently once again be effected.

While a specific embodiment of the invention has been shown and described in detail to illustrate the application of the inventive principles, it will be understood that the invention may be embodied otherwise without departing from such principles.

What is claimed is:

1. A clutch assembly for vehicles comprising:
  a clutch housing;
  a clutch in said housing, said clutch including clutch disc means, spring means actuating said clutch disc means and disengagement means coupled with said spring means and movable relative to said clutch disc means between a first position for effecting engagement of said clutch and a second position for effecting disengagement of said clutch;
  pump means structurally associated with said disengagement means for supplying fluid for said clutch in a fluid stream;
  deflector means for directing said fluid to said clutch disc means;
  pump wheel means rotatively affixed with said clutch disc means arranged relative to said deflector means for deflecting said fluid stream away from said clutch disc means; and
  guide wheel means connected for movement with said disengagement means, said guide wheel means operating when said disengagement means is in said first position to direct said fluid stream to said deflector means for delivery to said clutch disc means and when said disengagement means is in said second position to divert said fluid stream to said pump wheel means for directing said fluid stream away from said clutch disc means for recirculation through said pump means.

2. A clutch according to claim 1 wherein said guide wheel means is concentrically arranged in said clutch and operates to feed said fluid radially outwardly, said pump wheel means being configured with a curvature to deflect said fluid in the axial direction of said clutch when said clutch is in the disengaged state.

3. A clutch assembly according to claim 2 wherein said curvature is arranged in the vicinity of said clutch disc means and operates to divert said fluid stream away from said clutch.

* * * * *